March 17, 1959  T. O. R. DAHLBERG  2,877,559
DEVICES FOR MEASURING AND RECORDING DIAMETER
DIMENSIONS AND SPECIES OF TREES
Filed Nov. 22, 1955  2 Sheets-Sheet 2
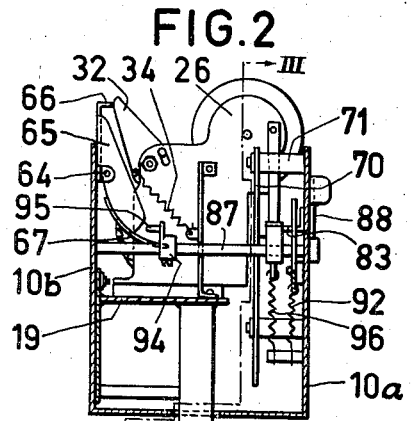
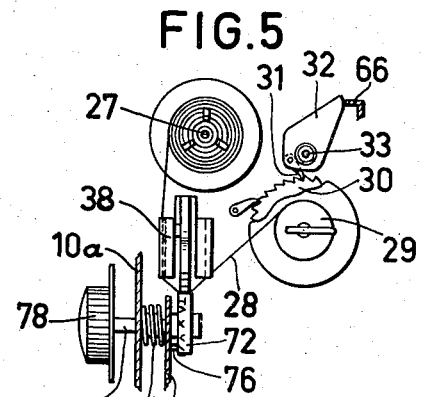
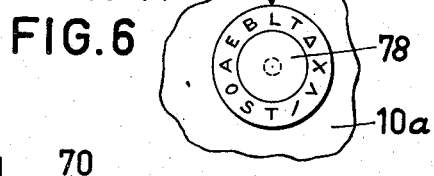
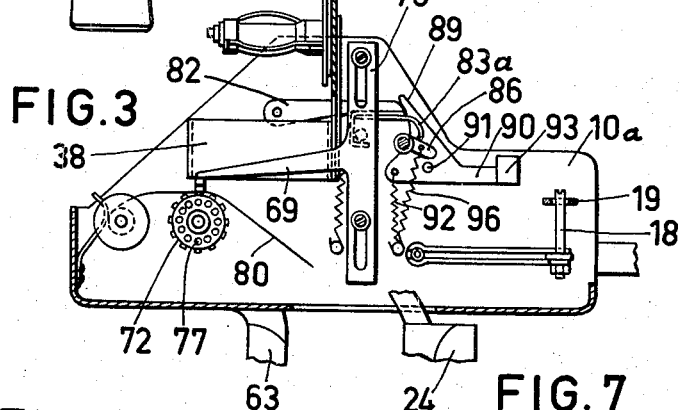
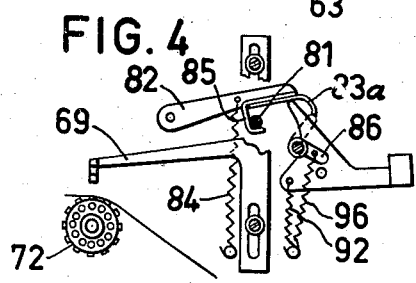
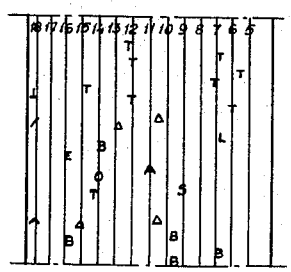
Inventor:
T. O. R. Dahlberg
By: Hancock Downing & Seebold
Attys.

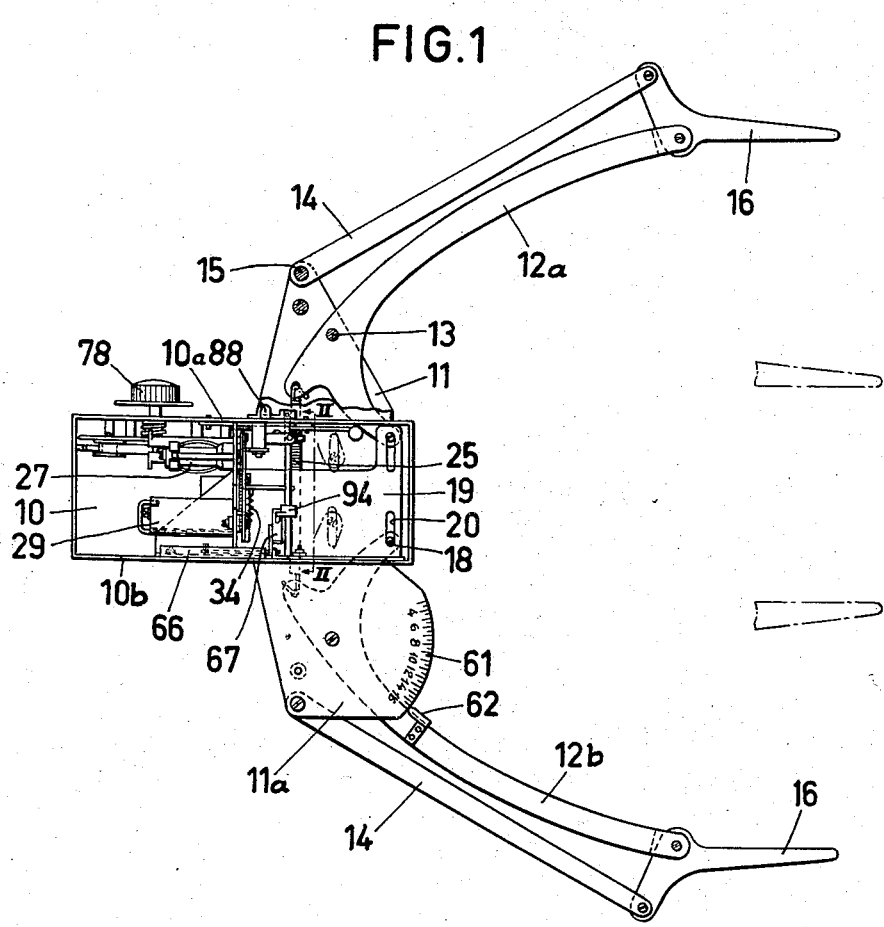

2,877,559
Patented Mar. 17, 1959

2,877,559

DEVICES FOR MEASURING AND RECORDING DIAMETER DIMENSIONS AND SPECIES OF TREES

Tord Olof Rickard Dahlberg, Bromma, Sweden

Application November 22, 1955, Serial No. 548,521

Claims priority, application Sweden November 25, 1954

7 Claims. (Cl. 33—148)

The present invention relates to a new and improved portable measuring device especially suited for use in forestry for measuring and recording the dimensions, species and certain other characteristics of trees.

In my co-pending patent application, Serial No. 436,123, filed on June 11, 1954, now Patent No. 2,834,114, I have described and claimed as measuring instrument for the abovementioned purpose which is easily portable and greatly facilitates the recording of the aforesaid data. An object of the present invention is the provision of a portable measuring instrument of the general type described and claimed in my aforementioned patent application, Ser. No. 436,123, which incorporates improved means for recording measurements.

Another object of the invention is improved means for actuating the recording means.

A still further object is improved means for setting the recording means into position for recording one selected of a number of tree species foreseen.

In the accompanying drawings—

Fig. 1 is a top plan view of an instrument, the top cover being removed,

Fig. 2 is a section on the line II—II in Fig. 1,

Fig. 3 is a longitudinal section on the line III—III in Fig. 2,

Fig. 4 is a fragmentary view of the printing means in a loaded position,

Fig. 5 is a fragmentary view of the printing mechanism and the record strip feed mechanism, Fig. 6 is an elevation of the setting knob for the type wheel, Fig. 7 illustrates a portion of a record strip.

Several parts of the instrument are identical with or similar to corresponding parts of the instrument described in my aforesaid co-pending patent application, Ser. No. 436,123; such parts have therefore been given the same reference numerals.

The measuring and recording instrument is enclosed in and protected by a casing 10 the top of which is covered in use by a hinged lid member (not shown in the drawings) which may be secured and locked in the closed position by a locking device of any known or suitable kind.

The side walls of casing 10 each comprise a member 10a, 10b respectively. From each of casing members 10a, 10b two vertically spaced bracket members 11 and 11a extend transversely, and between each associated pair of bracket members a measuring shank 12a, 12b respectively, is pivoted at its inner end about a pivot 13. Alongside each shank 12a, 12b a link member 14 is provided, the link being pivoted as at 15 at its inner end between bracket members 11, 11a. The outer end of each shank 12a, 12b and the corresponding end of the associated link member 14 is pivotally connected to the shorter arm of an angularly shaped two-armed lever 16, the longer arm of which forms a measuring jaw adapted to engage the sides of the measuring object, e. g. a tree trunk. The linkage formed by the shanks 12a, 12b, link members 14 and measuring jaws 16 is such as to maintain parallelism between the measuring jaws 16 as the shanks 12a, 12b are swung towards or away from each other. The one upper bracket member denoted 11a has its front edge shaped as an arc of a circle, and a scale 61 is provided at said edge. A pointer 62 affixed to measuring shank 12b is adapted to cooperate with the scale 61 to afford readings which correspond to the actual distance between the measuring jaws 16, said scale being conveniently divided into inches and suitable fractions thereof.

The inner extremities of the measuring shanks 12a, 12b each form the shortest arm of a three-armed lever the longest arm of which is formed by the measuring shank itself. The third arms engage each with a transverse slot 20 by means of a stud member 18 secured to said third arm, the slots 20 being machined in a slide member 19 which is arranged for a lengthwise reciprocatory travel along suitable guide members forming part of casing 10 and not shown in the drawings. Slide member 19 has secured thereto an operating handle 24 which extends downwards through an aperture in the bottom of casing 10. Behind operating handle 24 a fixed handle 63 is secured to the bottom of casing 10, and likewise projects downwards by which handle the instrument is held when in use. The operator's hand grasps both handles 24, 63 simultaneously and handle 24 thus may readily be pressed backwards to move measuring shanks 12a, 12b towards each other. A tension spring 25 connecting the aforesaid shortest arms of the measuring shanks 12a, 12b tends to force the latter apart, and their position thus is controlled by pressing handles 24 and 63 together, or by casing the grip, depending on whether the shanks are to be moved together or apart. The geometric relations between the different moving parts are matched in such a way that a certain increment or reduction of the distance between the measuring jaws 16 will correspond to a substantially directly proportional length of travel of slide member 19. The displacement of the slide from its starting position therefore will represent in a scale depending on the transmission ratio a measure of the distance between the measuring jaws, and this circumstance is used when recording the measurements on a record tape 28 which is adapted to be fed transversely within the casing 10.

To slide member 19 a vertically extending plate member 26 is secured. Plate member 26 supports a spool 27 having its axis extending longitudinally of the instrument and carrying the record strip 28 which is slipped over spool 27 as a roll. Further a winding spool 29 is rotatively supported by plate member 26 and is provided with a ratchet wheel 30 adjacent member 26 (Figs. 1 and 5). A spring-loaded pawl 31 (Fig. 5) is pivoted on a flap member 32 the latter being in turn pivoted to plate member 26 as at 33. Pawl 31 engages ratchet wheel 30, and flap member 32 is maintained by a spring 34 (Fig. 2) in engagement with an inwardly bent upper edge portion 66 on a rocker plate 65 which is supported by a longitudinally extending rod 64 secured to casing member 10b. The normal or rest position of rocker plate 65 is determined by the engagement between the upper portion of plate 65 and casing member 10b (Fig. 2). The bottom portion of rocker plate 65 is shaped as a scoop 67 by means of which plate 65 may be rocked in a manner to be explained later to press against flap member 32 by its edge portion 66 thus actuating flap member 32 to feed ratchet wheel 30 a pitch distance by means of the associated pawl 31 whereby the record strip 28 will be fed a corresponding distance. Record strip 28 runs downwards from spool 27 below a pair of parallel projecting guide members 38 (Figs. 3 and 5) supported by and extending rearwards from plate member 26, and is received by winding spool 29.

A printing hammer 69 extends between guide members 38 and is formed with a cross-piece 70 at its forward end by which it is guided for vertical movement, there being elongated slots in the cross-piece 70 which engage corresponding studs 71 at casing member 10a (Figs. 2 to 4). The rear extremity of printing hammer 69 is provided with a printing pad disposed right above a type wheel 72 fast on a shaft 73 which is journalled in casing member 10a at one end, and in a plate 74 secured at a certain distance from casing member 10a and parallel to the latter, at the other (Fig. 5). A helical spring 75 surrounds shaft 73 between members 10a and 74, and tends to urge shaft 73 with type wheel 72 outwards, i. e. to the left in Fig. 5. A pin 76 projecting from plate 74 locates the type wheel 72 by engaging any selected one of a plurality of evenly spaced holes 77 in the face thereof. The number of the holes 77 is equal to the number of individual types on type wheel 72, and when a hole makes engagement with pin 76 the corresponding type on the type wheel is in its printing, i. e. its topmost position.

The shaft 73 is extended outside the casing 10, and at its extremity a setting knob 78 is secured which is marked with a number of letters and symbols (Fig. 6). These letters and symbols correspond to those on the type wheel; their significance will be explained later. When any one of the markings on the knob 78 is set opposite an index marking 79 provided at the casing member 10a the corresponding type on type wheel 72 will assume its topmost position right under the printing hammer 69, and may be printed onto the record strip 28. An ink ribbon 80 is interposed between the type wheel and the record strip, and may be fed by any suitable mechanism not specifically disclosed. For the purpose of setting a desired latter or symbol in the printing position knob 78 is pushed inwards to bring type wheel 72 out of engagement with pin 76 against the action of spring 75, and may subsequently be turned to its new, desired position in which it is secured by engagement between pin 76 and the appropriate hole 77.

For performing the printing operation loading and actuating mechanism is provided for printing hammer 69. Thus, the cross-piece 70 of the printing hammer has a lateral projection 81 (Fig. 4). An arm member 82 which is pivoted to casing member 10a is adapted to engage with a flange portion 83 (Fig. 2) the top of projection 81 so that the cross-piece 70 may be suddenly pulled downwards by a coil spring 84 extending between arm 82 and a portion of casing 10, from the position illustrated in Fig. 4 to the position shown in Fig. 3, thus forcing the printing hammer 69 against type wheel 72. A U-shaped leaf spring 85 is secured to flange 83, and engages projection 81 by its lower shank. Spring 85 will be loaded to some degree on the impact of the printing hammer 69 against the type wheel 72 thereby producing a desirable recoil action when printing. Further, spring 85 keeps the printing hammer clear of the type wheel thereby permitting the setting of the latter without its imparting non-desired markings onto the record strip 28. Leaf spring 85 further assists in urging the cross-piece 70 upwards when loading the printing hammer. Said loading is effected by means of a cam member 86 (Figs. 3 and 4) fast on a shaft 87 (Fig. 2) which is journalled in casing members 10a, 10b, and which extends outside casing member 10a, a setting lever 88 being secured to the shaft extension outside the casing. When setting lever 88 is actuated in a manner as to rotate cam member 86 from its position shown in full lines in Fig. 4 to the position shown in broken lines against the action of a spring 96, the cam member will engage a bent-down extremity 83a of flange portion 83 on arm 82 and will raise the latter until an extension 89 at one end of a trigger plate 90 which is pivoted on a stud 91 to the casing member 10a, and loaded by a spring 92 to rock counterclockwise in Figs. 3 and 4, will swing in below flange portion 83, and thus will retain arm 82, and consequently the cross-piece 70 in the topmost position. The printing hammer 69 now is loaded. By manually pressing down a push button provided at the other extremity of trigger plate 90 the arm 82 will be released, and will be quickly pulled down by its associated spring 84 thereby forcing down the cross-piece 70 with printing hammer 69 to perform a printing operation. In the lid of the casing (not shown) an aperture may be provided for push button 93 which may thus be actuated from outside the casing with the lid of the latter in position. The button 93 stays down after depression, since the extension 89 of trigger plate 90 then abuts the end of arm member 82 (Fig. 3), and prevents spring 92 from rocking trigger plate 90 back to the position shown in Fig. 4. The printing mechanism therefore cannot be actuated until the printing hammer has been loaded again by means of setting lever 88.

Onto shaft 87 a crank-shaped member 94 (Fig. 2) is further secured, affording a sideways projection 95 which is adapted to engage the projecting portion 67 of rocker plate 65 upon loading the printing hammer by means of setting lever 88, thereby causing rocker plate 65 to rock counterclockwise as in Fig. 2. The inwardly bent top edge 66 of rocker plate 65 thereby will rock flap member 32 clockwise momentarily, causing the feeding of record strip 28 in a manner already described, before the trigger plate 90 engages with its extension 89 below the flange portion 83 of arm 82, and retains the latter in its loaded position.

On all other occasions the flap member 32 will slide along the edge 66 upon the reciprocating movements of slide 19 without being actuated, as it will be imparted a rocking movement, only when the printing hammer mechanism is being loaded in the manner described.

On the record strip 28 printed indications may thus be obtained, the lateral positions of which represent the measures gauged by the measuring jaws 16. These markings are selected by means of knob 78. In the illustrated embodiment there are twelve markings provided on the type wheel and on knob 78 (Fig. 6), viz. S, O, A, E, B, L, T, △, X, ∧, / and ⊥. The eight first of these symbols refer to different tree species while the four last serve for other purposes. X is a symbol for use when measuring heights, and has no immediate bearing upon the present invention. ∧ denotes a tree which has been damaged, / is the symbol for a fallen tree, and ⊥ is used to record a barren tree. These last-mentioned four symbols are conveniently indicated in a color different than the others on knob 78, and they are conveniently recorded at one edge of the record strip 28 after the diameter size has been printed at the appropriate position on the strip, the said symbols indicating the condition of trees which differ from the normal state in certain respects. In order to enable the printing of these symbols in alignment with the corresponding measurements they are axially offset a feed step on the type wheel 72 with regard to the other signs, whereby the corresponding marking will be printed on the same line as the associated diameter measurement upon actuation of push button 93 after the strip has been fed forwards a step through loading of the printing mechanism by setting lever 88. The printing of the signs symbolizing the condition of the trees is preferably made with the measuring shanks spaced apart as far as possible, with this position of the shanks corresponding to a position of the record strip in which one edge portion thereof is situated immediately above type wheel 72.

A portion of a record strip with printed-on markings is illustrated in Fig. 7 which shows how dimensions are recorded through the transverse position of markings while the tree species are indicated by their specific symbols. The symbols at the left edge of the record strip indicate the special condition referring to the tree recorded on the same level, and the figures at the top edge of the strip portion indicate the diameter sizes in inches. The printing is effected by actuating push button 93 after the shanks have engaged the measuring object, and the printing mechanism has been loaded by setting lever 88.

What I claim is:

1. In a portable instrument for measuring and recording dimensions, species and other characteristics of trees, said instrument comprising an instrument casing, a pair of measuring shanks, each being pivoted to said casing for movement towards and away from each other, manually operated means to effect said movements of the shanks, a record strip within said casing for movement therein, supporting structure and feeding mechanism for said record strip, with the supporting structure having its axis extending longitudinally of the casing, a slide for guiding said structure for reciprocating longitudinal travel within said casing, an angular arm on each shank means operatively connecting said slide with each angular arm of said measuring shanks to effect transverse positions of the record strip which depend upon the distance between said measuring shanks, a spring-urged printing hammer, a type wheel having a plurality of types at the circumference thereof, and being adapted to be set manually in any of a corresponding number of printing positions and to transfer markings to said record strip upon being struck by said printing hammer, setting means for loading said spring-urged printing hammer, said setting means being operatively connected to said record strip feeding mechanism to impart a stepwise feed movement to said record strip upon loading said printing hammer, and trigger means to actuate the printing operation of said printing hammer.

2. A portable measuring and recording instrument as claimed in claim 1 wherein the setting means for loading said printing hammer comprises a manually controlled setting lever adapted upon being moved from a first position to a second position to load spring means operatively connected to said printing hammer, said setting lever further being adapted to unlatch said trigger means upon its being moved from said first position to said second position.

3. In portable measuring and recording instrument as claimed in claim 1 including means for retaining said trigger means in a non-operative position until after the loading of said printing hammer and feed movement of said record strip by means of said setting means.

4. A portable measuring and recording instrument as claimed in claim 1 wherein a setting knob is provided for selecting and setting the positions of said type wheel, and locking means being provided to locate any selected position of the type wheel.

5. A portable measuring and recording instrument as claimed in claim 1, wherein certain of the types provided at the circumference of said typewheel are offset a distance corresponding to a feed step of said record strip in the direction of feed of the record strip.

6. In a portable measuring and recording instrument as claimed in claim 1, a slide member for supporting and guiding said printing hammer, said slide member being adapted to operatively engage recoil spring means for imparting a recoil action to the printing hammer upon the printing operation of the hammer.

7. In a portable measuring and recording instrument as claimed in claim 1, a slide member for supporting and guiding said printing hammer and a spring-urged arm member for operative engagement with the printing hammer to impart a printing movement thereto, a cam member being operatively connected to said setting means to engage said arm member for moving the arm member upon the setting of said setting means into a position wherein said spring is loaded, said trigger means being adapted to retain said arm member in its loaded position until having been actuated by an operator to release the latter and cause the printing operation to be performed.

References Cited in the file of this patent

UNITED STATES PATENTS 1,675,969    Bull _____ July 3, 1928

FOREIGN PATENTS 49,391    Sweden _____ June 8, 1921